United States Patent
Chacko et al.

(10) Patent No.: US 10,982,723 B1
(45) Date of Patent: Apr. 20, 2021

(54) FRICTION CLUTCH ASSEMBLIES WITH LOW-DRAG DISCONNECT CLUTCH PACK HAVING CONE CLUTCH SYNCHRONIZER

(71) Applicant: GM GLOBAL TECHNOLOGY OPERATIONS LLC, Detroit, MI (US)

(72) Inventors: Ashwin A. Chacko, Southfield, MI (US); David S. Schulz, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 4 days.

(21) Appl. No.: 16/686,421

(22) Filed: Nov. 18, 2019

(51) Int. Cl.
| | |
|---|---|
| *F16D 13/24* | (2006.01) |
| *F16H 61/04* | (2006.01) |
| *F16D 13/64* | (2006.01) |
| *F16D 13/52* | (2006.01) |

(52) U.S. Cl.
CPC ........... *F16D 13/24* (2013.01); *F16D 13/646* (2013.01); *F16D 13/648* (2013.01); *F16H 61/0403* (2013.01); *F16D 13/52* (2013.01); *F16H 2061/0466* (2013.01)

(58) Field of Classification Search
CPC ...... F16D 13/24; F16D 13/646; F16D 13/648; F16D 13/52; F16D 11/14; F16D 21/08; F16H 61/0403; F16H 2061/0466
See application file for complete search history.

(56) References Cited

U.S. PATENT DOCUMENTS

| | | | |
|---|---|---|---|
| 3,552,534 A | 1/1971 | Kern | |
| 4,860,861 A | 8/1989 | Gooch et al. | |
| 4,889,012 A | 12/1989 | Dull | |
| 4,995,500 A | 2/1991 | Payvar | |
| 5,947,243 A | 9/1999 | MacDonald | |
| 6,250,445 B1* | 6/2001 | Davis | F16D 13/52 |
| | | | 192/222 |
| 7,198,587 B2 | 4/2007 | Samie et al. | |
| 7,448,483 B2 | 11/2008 | Arcot et al. | |
| 7,681,675 B2 | 3/2010 | Samie et al. | |
| 7,824,292 B2 | 11/2010 | Samie et al. | |
| 7,862,437 B2 | 1/2011 | Clark et al. | |
| 7,878,935 B2 | 2/2011 | Lahr | |
| 7,931,561 B2 | 4/2011 | Otanez et al. | |
| 7,980,992 B2 | 7/2011 | Sturgin | |
| 8,011,464 B2 | 9/2011 | Samie et al. | |

(Continued)

*Primary Examiner* — Huan Le
(74) *Attorney, Agent, or Firm* — Quinn IP Law (57) ABSTRACT

Friction clutch assemblies with low-drag clutch packs having cone-clutch synchronizers and dog-clutch bypass devices are presented. A friction clutch assembly includes a housing that drivingly couples to an output (or input) member, and a disc hub rotatably mounted inside the housing that drivingly couples to the input (or output) member. A disc carrier is rotatably and slidably mounted inside the housing coaxial with the disc hub. A clutch pack includes reaction plates secured to the housing (or disc carrier) for common rotation therewith, and friction plates interleaved with the reaction plates and secured to the disc carrier (or housing) for common rotation therewith. A cone clutch is interposed between the clutch pack and disc hub such that frictional engagement of the cone clutch with the disc hub allows for compression of the pack to carry torque from the input member, through the disc hub and housing, to the output member.

20 Claims, 3 Drawing Sheets

(56) References Cited

U.S. PATENT DOCUMENTS

| | | |
|---|---|---|
| 8,029,403 B2 | 10/2011 | Lee et al. |
| 8,042,669 B2 | 10/2011 | Samie et al. |
| 8,042,670 B2 | 10/2011 | Bartos et al. |
| 8,056,690 B2 | 11/2011 | Samie et al. |
| 8,061,496 B2 | 11/2011 | Samie et al. |
| 8,083,042 B2 | 12/2011 | Samie et al. |
| 8,087,502 B2 | 1/2012 | Samie et al. |
| 8,177,677 B2 | 5/2012 | Samie et al. |
| 8,196,724 B2 | 6/2012 | Samie et al. |
| 8,202,198 B2 | 6/2012 | Samie et al. |
| 8,287,411 B2 | 10/2012 | Lee et al. |
| 8,296,020 B2 | 10/2012 | Lee et al. |
| 8,348,796 B2 | 1/2013 | Samie et al. |
| 8,357,069 B2 | 1/2013 | Diemer et al. |
| 8,371,982 B2 | 2/2013 | Lee et al. |
| 8,371,984 B2 | 2/2013 | Diemer et al. |
| 8,409,053 B2 | 4/2013 | Samie et al. |
| 8,425,364 B2 | 4/2013 | Lahr |
| 8,454,466 B2 | 6/2013 | Samie et al. |
| 8,469,847 B2 | 6/2013 | Lee et al. |
| 8,478,498 B2 | 7/2013 | Lee et al. |
| 8,494,738 B2 | 7/2013 | Lee et al. |
| 8,499,912 B2 | 8/2013 | Samie et al. |
| 8,540,065 B2 | 9/2013 | Samie et al. |
| 8,606,709 B2 | 12/2013 | Gupta |
| 8,622,186 B2 | 1/2014 | Samie et al. |
| 8,655,525 B2 | 2/2014 | Samie et al. |
| 9,073,432 B2 | 7/2015 | Downs et al. |
| 9,205,739 B2 | 12/2015 | Ekonen et al. |
| 10,066,722 B2 | 9/2018 | Dewangan et al. |
| 10,288,159 B2 | 5/2019 | Li et al. |
| 10,293,674 B1 | 5/2019 | Wilton |
| 2005/0126878 A1 | 6/2005 | Samie |
| 2010/0273603 A1 | 10/2010 | Roses et al. |
| 2012/0090952 A1 | 4/2012 | Lee et al. |
| 2014/0251744 A1 | 9/2014 | Steinberger et al. |
| 2016/0303966 A1* | 10/2016 | Horie ............... F16D 11/14 |
| 2017/0326962 A1* | 11/2017 | Aringsmann ........ F16D 13/24 |
| 2017/0328455 A1 | 11/2017 | Li et al. |
| 2017/0328456 A1 | 11/2017 | Samie et al. |
| 2018/0134154 A1* | 5/2018 | Shimizu ............ B60W 10/16 |
| 2018/0163793 A1 | 6/2018 | Jeong et al. |
| 2018/0355962 A1 | 12/2018 | Lahr et al. |
| 2019/0168731 A1 | 6/2019 | Lee et al. |

* cited by examiner

FRICTION CLUTCH ASSEMBLIES WITH LOW-DRAG DISCONNECT CLUTCH PACK HAVING CONE CLUTCH SYNCHRONIZER

INTRODUCTION

The present disclosure relates generally to friction-type clutch assemblies. More specifically, aspects of this disclosure relate to four-wheel drive and all-wheel drive vehicle powertrains with driveshaft disconnect clutch assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles, on the other hand, utilize alternative power sources to propel the vehicle, such as an electric motor generator unit (MGU), and therefore minimize or eliminate reliance on a fossil-fuel based engine for tractive power.

Vehicle powertrains are predominantly available in four standard architectures: front-wheel drive (FWD), rear-wheel drive (RWD), four-wheel drive (4WD), and all-wheel drive (AWD) layouts. As the names imply, the prime mover in an FWD powertrain layout drives only the front two road wheels of a two-axle vehicle, whereas the prime mover in an RWD layout drives only the rear road wheels. Comparatively, 4WD layouts—including full-time and on-demand variants—are equipped with a transfer case that is controlled by a vehicle operator or powertrain control module (PCM) to selectively transfer torque from the prime mover to both forward and rear axles. Similar to 4WD architectures, an AWD powertrain layout transmits drive torque to all four of the vehicle's road wheels. Unlike on-demand 4WD, however, conventional AWD vehicles power all four wheels at all times during in-gear vehicle motion and, unlike full-time 4WD, AWD vehicles frequently transfer torque to both vehicle axles in unequal proportions.

Many modern AWD vehicle powertrains now utilize a front-wheel drive arrangement with transverse-mounted engine and transaxle assemblies for transferring drive torque to both the primary (front) driveline and secondary (rear) driveline in order to provide optimized traction during vehicle operation in inclement weather and off-road conditions. In lieu of longitudinally mounted engine arrangements with low-range-gear transfer cases of traditional 4WD vehicles, many on-demand AWD layouts implement a power take-off unit (PTU) for selectively and/or automatically connecting the engine and transmission to the front and rear drivelines. The PTU is oftentimes side-mounted onto the output end of the transmission housing and contains intermeshed ring and pinion gears that are driven by the output shaft of the transverse-mounted transmission. The transmission-driven ring gear rotates the pinion gear, which in turn transmits torque to the front axle halfshafts as well as the rear axle, e.g., by way of a rear propeller (prop) shaft and a rear drive module (RDM). A hydraulic or pneumatic disconnect clutch may be interposed between the RDM and PTU to selectively couple and uncouple the output component of the PTU with respect to the input component of the RDM.

SUMMARY

Presented herein are friction clutch assemblies with low-drag clutch packs having cone clutch synchronizers and dog clutch couplings, methods for making and methods for using such friction clutch assemblies, and motor vehicles equipped with such friction clutch assemblies. By way of example, there is presented a friction-type disconnect clutch assembly for the rear-drive module of an on-demand AWD vehicle powertrain. The disconnect clutch assembly utilizes a dog clutch coupling system to instantaneously disconnect an RDM from the PTU and, thus, improve system efficiency by drastically minimizing or otherwise eliminating drag losses. To control clutch torque loading while concomitantly improving noise, vibration and harshness (NVH) performance (e.g., eliminate differential gear rumble), an in-line wet cone clutch synchronizes clutch engagement to enable on-the-fly connects. The dog clutch adjoins one end of a friction-disc clutch pack, sandwiching therein the friction disc of the wet cone clutch. The dog clutch provides a parallel power flow path for bypassing the cone clutch and providing interlocked mechanical engagement between the clutch pack and inner disc carrier and, thus, between the pinion gear shaft and stub shaft.

Aspects of this disclosure are directed to friction-type clutch assemblies with low-drag disconnect clutch packs having cone-clutch synchronizers and dog-clutch bypass devices. In an example, a friction clutch assembly is presented for transferring torque from a rotating input member (e.g., a prop shaft of an AWD powertrain system) to a rotatable output member (e.g., an input shaft of an RDM). The friction clutch assembly includes a clutch housing that drivingly attaches to the output member (or input member), and an inner disc hub rotatably mounted wholly or partially inside the clutch housing that drivingly attaches to the input member (or output member). A dynamic disc carrier is rotatably mounted inside the clutch housing, coaxially aligned with and slidable on the inner disc hub. A clutch pack, which is disposed inside the clutch housing, includes a stack of interleaved reaction and friction plates. The reaction plates are secured to the clutch housing (or dynamic disc carrier) for rotation in unison therewith, and the friction plates are secured to the dynamic disc carrier (or clutch housing) for rotation in unison therewith. A cone clutch is located inside the clutch housing, interposed between the clutch pack and inner disc hub. A dog clutch is connected to the dynamic disc carrier and operable to mechanically rotatably lock the dynamic disc carrier to the inner disc hub. Translation of the dynamic disc carrier causes frictional engagement of the cone clutch with the inner disc hub; this concomitantly synchronizes engagement of the dog clutch with the inner disc hub. Engaging the dog clutch allows for compression of the clutch pack to command torque across the friction clutch assembly.

Additional aspects of this disclosure are directed to motor vehicles equipped with any of the disclosed clutch assemblies. As used herein, the terms "vehicle" and "motor vehicle" may be used interchangeably and synonymously to include any relevant vehicle platform, such as passenger vehicles (e.g., internal combustion, hybrid electric, full electric, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle is presented that includes a vehicle body with front and rear axles, multiple road wheels rotatably mounted on the axles, and other standard original equipment. Also mounted to the vehicle body is a powertrain system with a prime mover, such as a traction motor and/or an internal combustion engine, that is selectively connected to a multi-speed transmission to drive one or more of the road wheels and thereby propel the vehicle. A power take-off unit is drivingly connected to the transmission and operable to transfer torque output therefrom to the front and rear axles, e.g., via a prop shaft and a rear drive module.

Continuing with the discussion of the above example, the motor vehicle also includes a friction clutch assembly that is operable to selectively disconnect the transmission from the rear axle. The friction clutch assembly includes a clutch housing with a stub shaft mounted to and closing off an open end of a cylindrical shell. The stub shaft is splined to the prop shaft for unitary rotation therewith. An inner disc hub, which is rotatably mounted wholly or partially inside the clutch housing's cylindrical shell, is splined to a pinion shaft of a rear-drive module. The clutch assembly also includes a dynamic disc carrier that is rotatably mounted inside the cylindrical shell of the clutch housing, concentric with the inner disc hub. The dynamic disc carrier is axially slidable on the inner disc hub. A clutch pack is disposed within the clutch housing and includes a stack of reaction plates interleaved with friction plates. The reaction plates are secured to the cylindrical shell for common rotation therewith, and the friction plates are secured to the dynamic disc carrier for common rotation therewith. A dog clutch is rigidly mounted onto the dynamic disc carrier and operable to mechanically rotatably lock the dynamic disc carrier to the inner disc hub. A cone clutch is mounted on the dynamic disc carrier, interposed between the clutch pack and inner disc hub. Axial translation of the dynamic disc carrier on the inner disc hub towards the prop shaft causes the cone clutch to frictionally engage the inner disc hub; this in turn synchronizes engagement of the dog clutch with the inner disc hub. Once synchronized, the clutch pack compresses, e.g., via continued translation of a piston of a ball-ramp actuator, to thereby carry torque from the prop shaft, through the clutch housing and inner disc hub, and out to the rear-drive module via the pinion shaft.

Other aspects of this disclosure are directed to control algorithms and processing logic for making or for using any of the disclosed clutch assemblies, torque transfer systems, and/or motor vehicles. In an example, a method is presented for assembling a friction-type disconnect clutch assembly. This representative method includes, in any order and in any combination with any of the above and below disclosed options and features: receiving a clutch housing configured to attach to one of a rotating input member or a rotatable output member; rotatably mounting an inner disc hub at least partially inside the clutch housing, the inner disc hub being configured to attach to the other of the input member or the output member; rotatably mounting a dynamic disc carrier at least partially inside the clutch housing coaxial with the inner disc hub, the dynamic disc carrier being axially movable on the inner disc hub; positioning a clutch pack within the clutch housing, the clutch pack including a plurality of reaction plates interleaved with a plurality of friction plates, the reaction plates being secured to one of the clutch housing or the dynamic disc carrier for common rotation therewith, and the friction plates being secured to the other of the clutch housing or the dynamic disc carrier for common rotation therewith; rigidly mounting a dog clutch to the dynamic disc carrier, the dog clutch being configured to mechanically rotatably lock the dynamic disc carrier to the inner disc hub; and mounting a cone clutch onto the dynamic disc carrier, positioned between the clutch pack and the inner disc hub, such that axially movement of the dynamic disc carrier causes frictional engagement of the cone clutch with the inner disc hub to compress the clutch pack and thereby carry torque from the input member, through the clutch housing and inner disc hub, and out to the output member.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
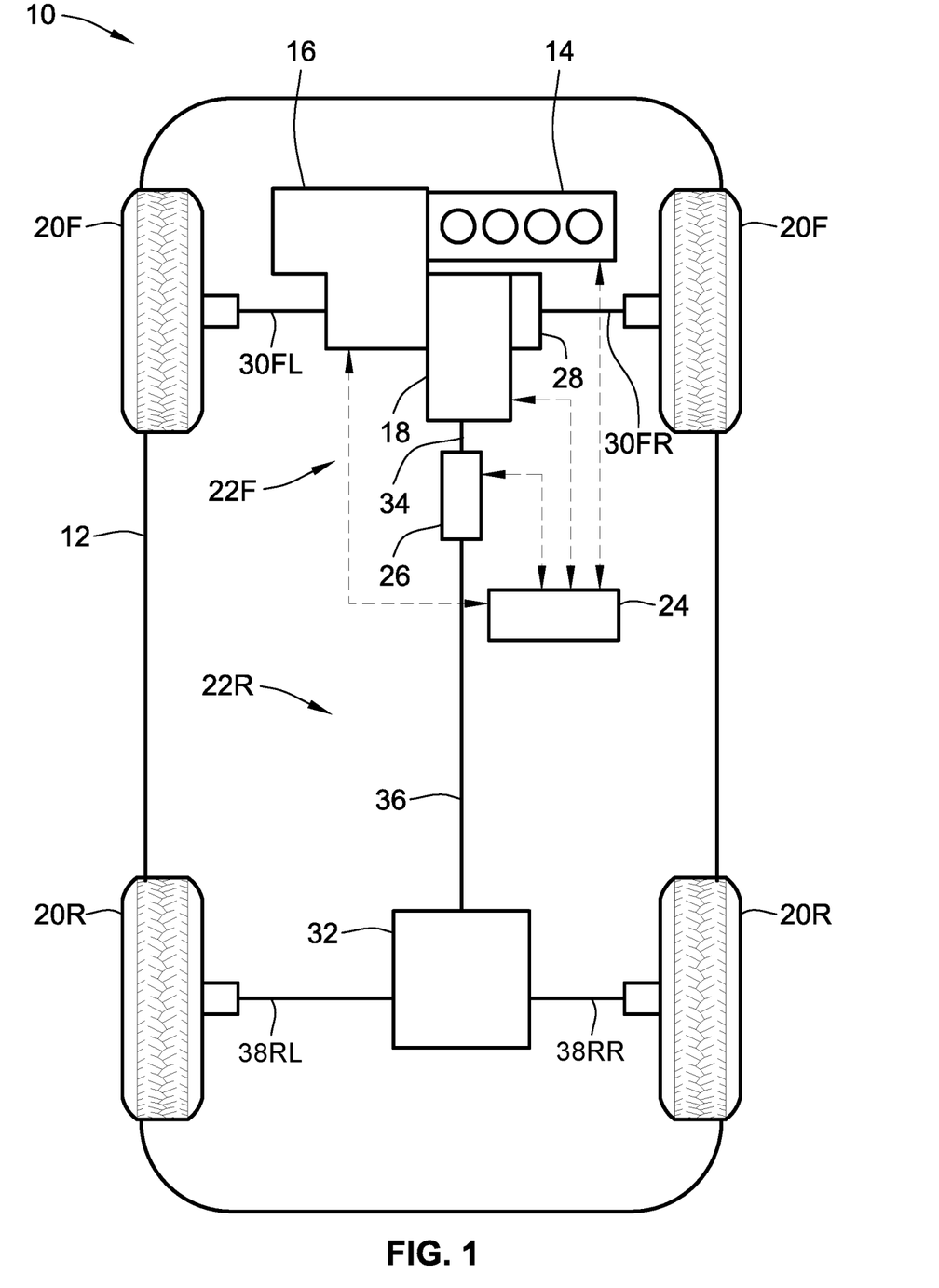
FIG. 1 is a schematic illustration of a representative motor vehicle with an all-wheel drive (AWD) powertrain equipped with a disconnect clutch assembly interposed between a PTU and RDM in accordance with aspects of the present disclosure.

Referring now to the drawings, wherein like reference numbers refer to like features throughout the several views, there is shown in FIG. 1 a representative automobile, which is designated generally at 10 and portrayed herein for purposes of discussion as an AWD sedan-type passenger vehicle. In particular, the illustrated vehicle powertrain is generally composed of a transversely mounted internal combustion engine (ICE) assembly 14, a power transmission 16, and a power take-off unit (PTU) assembly 18 that are mounted on a vehicle body 12 and operate to transmit tractive power to drive one or more road wheels 20R, 20F of the vehicle's final drive system. The illustrated automobile 10—also referred to herein as "motor vehicle" or "vehicle" for short—is merely an exemplary application with which aspects and features of this disclosure may be practiced. In the same vein, implementation of the present concepts for the specific AWD powertrain architecture discussed below should also be appreciated as an exemplary application of novel features disclosed herein. As such, it will be understood that aspects and features of this disclosure may be incorporated into alternative powertrain architectures, utilized for both automotive and non-automotive applications, and implemented for any logically relevant type of motor vehicle. Moreover, only select components of the powertrain architectures and motor vehicles are shown and will be described in additional detail herein. Nevertheless, the vehicles, systems and devices discussed herein may include numerous additional and alternative features, and other available peripheral components, for example, for carrying out the various methods and functions of this disclosure.

The representative vehicle powertrain system is shown in FIG. 1 with a prime mover—represented herein by a restartable, reciprocating-piston-type inline four-cylinder ("straight four") engine assembly 14—that is drivingly connected to a front (primary) driveline 22F and a rear (secondary) driveline 22R by an automatic multi-speed power transmission 16 and a power-splitting PTU assembly 18. The ICE assembly 14 transfers power, preferably by way of torque via an engine crankshaft and hub (not shown), to a hydrodynamic torque converter and transmission input shaft (not shown) of the transmission 16. The transmission 16, in turn, is adapted to receive from the engine 14, selectively manipulate, and distribute tractive power through the PTU assembly 18 and to the front and rear road wheels 20R and 20F, respectively, to thereby propel the vehicle 10. In the example depicted in FIG. 1, the ICE assembly 14 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the powertrain may take on other available configurations, such as full-time and part-time 4WD layouts, on-demand and torque-split AWD layouts, six-by-four (6×4) layouts, etc.

Power transmission 16 may take on any suitable ratio-changing design, such as manual, automatic, and non-synchronous configurations that use differential gearing, belt-and-pulley drives, gear-and-motor electric drives, etc., to achieve selectively or continuously variable torque and speed ratios between transmission input and output shafts, e.g., while sending all or a fraction of its power through the variable elements. One form of differential gearing is the epicyclic "planetary" gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as a 6-speed automatic transmission, the power transmission 16 may optionally take on other suitable configurations, including Continuously Variable Transmissions (CVT), Infinitely Variable Transmissions (IVT), Electrically Variable Transmissions (EVT), automated-manual transmissions, etc.

Operation of any of the illustrated powertrain components may be governed by an onboard or remote vehicle controller, or a distributed network of controllers and/or control modules, such as programmable electronic control unit (ECU) 24. ECU 24 is constructed and programmed to govern, among other things, operation of the engine 14, transmission 16, PTU 18, and disconnect clutch assembly 26. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 24 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, transmission gear state, vehicle route and path planning data, traffic flow data, geospatial data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

With continuing reference to the representative example of FIG. 1, the front driveline 22F includes a front (primary) differential 28 having an input member (e.g., ring gear welded to a differential case) that is driven by a first output member (e.g., complementary pinion gear shaft) of the PTU assembly 18. Alternative constructions may integrate the front differential 28 into the power transmission 16 as part of a transaxle assembly, which is common for use in FWD-type, on-demand AWD vehicles. The front driveline 22F employs a pair of drive axle shafts, namely front-left and front-right axle halfshafts 30FL and 30FR, respectively, that couple internal output gears of the front differential 28 to the forward vehicle wheels 20F. Front differential 28 is a mechanical gear system that allows each wheel 20F of the front driveline 22F to rotate at a common speed or at a distinct speed, depending on vehicle operating conditions. In the same vein, a rear drive module (RDM) 32 allows each rear wheel 20R of the rear driveline 22R to rotate at a common and/or a distinct speed.

Side-mounted to the output end of the power transmission 16 is a PTU assembly 18 that operates to apportion the transmission's torque output between the front and rear drivelines 22F, 22R of the automobile 10. Optional vehicle variants may further or alternatively utilize the PTU assembly 18 for driving one or more auxiliaries, such as air compressors, water pumps, hydraulic fluid pumps, heating, ventilation and cooling (HVAC) fans, etc. An output member of the PTU assembly 18, such as pinion shaft 34 of FIG. 1, transmits a controlled amount of engine torque from the transmission 16 to the RDM 32 via the disconnect clutch assembly 26 and a rear propeller (prop) shaft 36. As will be explained in extensive detail hereinbelow during the discussion of FIGS. 2 and 3, the disconnect clutch assembly 26 is employed to transmit rotary power from the PTU assembly 18 to the secondary driveline 22R and, when desired, selectively disconnect the PTU assembly 18 from the prop shaft 36. The rear driveline 22R employs a discrete pair of drive axle shafts, namely rear-left and rear-right axle halfshafts 38RL and 38RR, respectively, that couple internal output gears of the RDM 32 to the rear vehicle wheels 20R.

Figure 2:
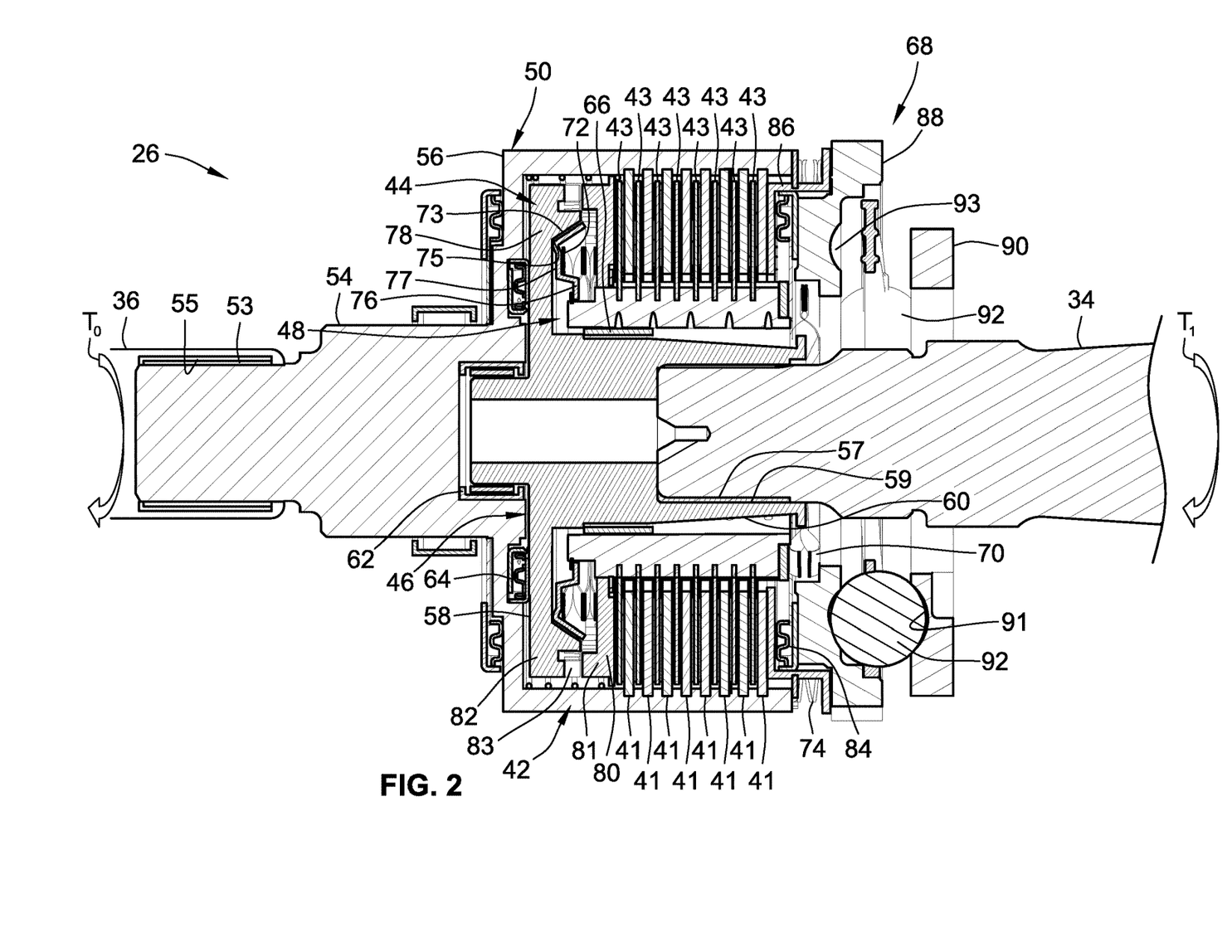
FIG. 2 is a cross-sectional, side-view illustration of a representative friction-type clutch assembly having a low-drag disconnect clutch pack with a cone-clutch synchronizer and a dog-clutch bypass device in accordance with aspects of the present disclosure.
Figure 3:
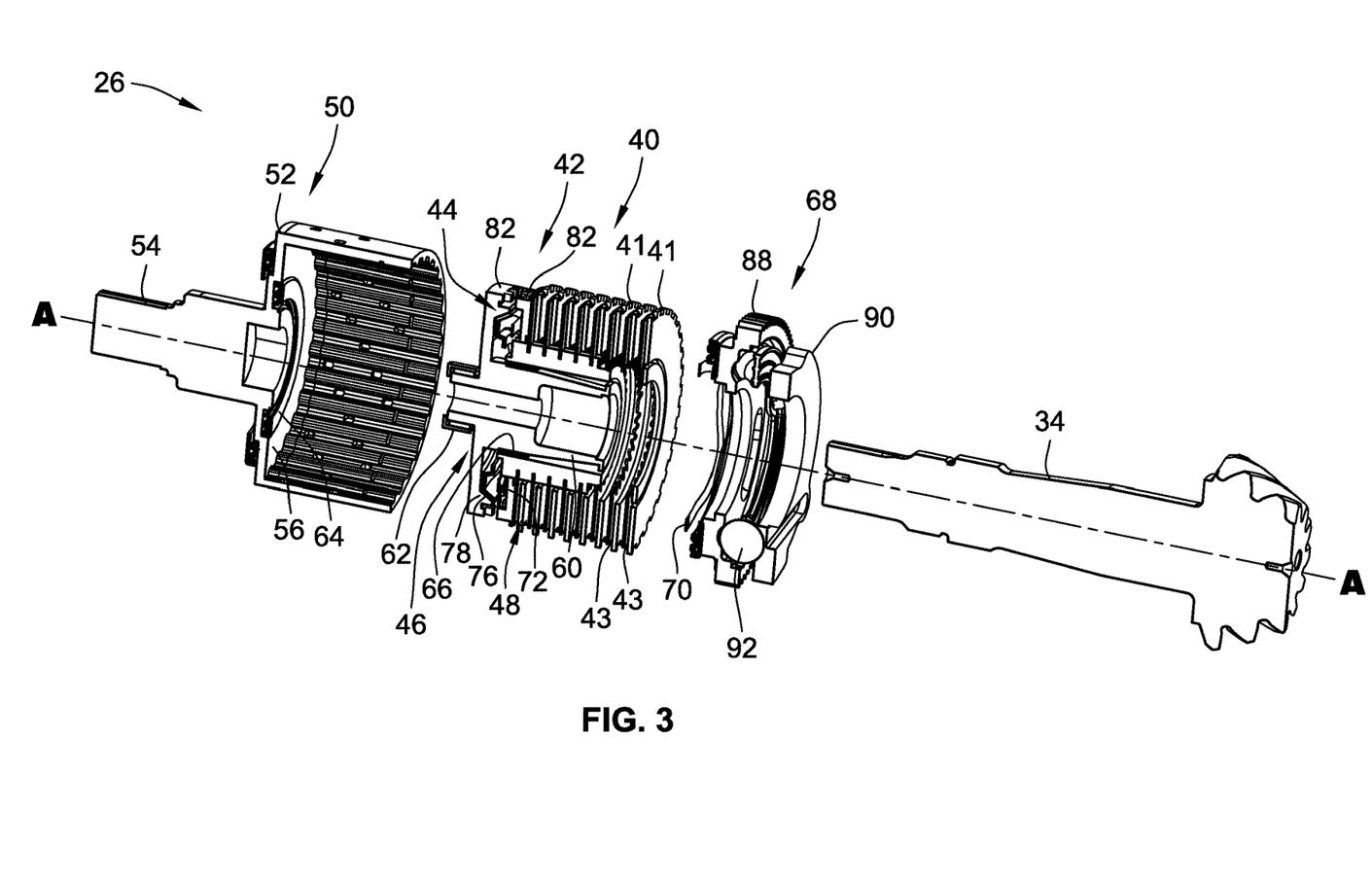
FIG. 3 is a partially exploded, perspective-view illustration of the representative disconnect clutch assembly of FIG. 2.

Presented in FIGS. 2 and 3 is a low-drag disconnecting torque transfer device with wet cone-clutch synchronizer and dog-clutch bypass mechanism for enabling "on-the-fly" connection of the PTU assembly 18 of FIG. 1 with the rear-drive module 32 and rear driveline 22R and, when desired, near instantaneous disconnect of all driven components downstream from the prop shaft 36. In so doing, the disconnect clutch assembly 26 helps to eliminate drag losses associated with driveline connects/disconnects while concomitantly optimizing powertrain efficiency and improving vehicle NVH performance. In general, the disconnect clutch assembly 26 is composed of three interoperable torque-carrying subsystems: a wet-type friction disc clutch 40, a sliding-clearance-fit dog clutch 42, and a wet-type cone clutch 44. When the disconnect clutch assembly 26 is in a torque-carrying "loaded" state, engine power is: (1) received as input torque Ti from the PTU assembly's pinion shaft 34 via an axially static inner disc hub 46; (2) transferred through the inner disc hub 46 to the dog clutch 42 and cone clutch 44; (3) conveyed from the dog clutch 42 and cone clutch 44 to an axially dynamic disc carrier 48; (4) transmitted through the disc carrier 48 and friction disc clutch 40 to an outer clutch housing 50; and (5) delivered through the clutch housing 50 to the prop shaft 36 as output torque $T_O$.

To shift the disconnect clutch assembly 26 to a non-torque-carrying "unloaded" state, the friction disc clutch 40, dog clutch 42 and cone clutch 44 are disengaged so as to freewheel within clutch housing 50.

The interoperable torque-carrying subsystems of the disconnect clutch assembly 26 are rotatably mounted inside and protected by the clutch housing 50. In accord with the illustrated example, the clutch housing 50 is typified by a rigid outer shell 52 with a stub shaft 54 that is operatively attached to and closes off an open end of the shell 52. The outer shell 52 is a hollow right-circular cylinder with an engine-facing open end through which the clutch assembly 26 receives the pinion shaft 34. An aft-facing end of the shell 52 is closed off by an annular flange 56; the stub shaft 54 projects generally orthogonally from the flange 56. While it is envisioned that the stub shaft 54 may be welded, keyed, fastened, threaded, or otherwise rigidly attached to the outer shell 52 to rotate in unison therewith, it may be desirable for ease of manufacture to integrally form the shell 52 and shaft 54 as a single-piece, unitary structure. A distal end of the stub shaft 54 includes exterior (male) spline teeth 53 that mesh with interior (female) spline teeth 55 of the prop shaft 36 (also referred to herein as "output member"). It is envisioned that the input and output ends of the disconnect clutch assembly 26 may be switched such that the stub shaft 54 operatively attaches to the pinion shaft 34 (also referred to herein as "input member") without departing from the scope of this disclosure.

Continuing with reference to both FIGS. 2 and 3, the inner disc hub 46 is rotatably mounted inside the clutch housing 50 to receive input torque Ti from the PTU assembly 18. As shown, the inner disc hub 46 is fabricated with a toroidal flange 58 that projects radially outward from a hollow cylindrical hub 60. For at least some embodiments, the toroidal flange 58 and cylindrical hub 60 are integrally formed, e.g., via casting and machining, as a single-piece, unitary structure. An internal roller bearing 62, which is nested inside a recessed cavity within the stub shaft 54, rotatably mounts the cylindrical hub 60 to the clutch's outer clutch housing 50 such that the inner disc hub 46 is coaxially aligned with the pinion shaft 34, prop shaft 36, and stub shaft 54 (e.g., on axis A-A of FIG. 3). A thrust bearing 64 mounted inside a recessed cavity of the annular flange 56 permits rotation of the inner disc hub 46 against the clutch housing 50 while supporting axial loads during activation of the disconnect clutch assembly 26. A flanged, proximal end of the cylindrical hub 60 projects axially from the engine-facing open end of the clutch housing 50. An internal cavity within the proximal end of the cylindrical hub 60 includes interior (female) spline teeth 57 that mesh with exterior (male) spline teeth 59 of the pinion shaft 34. Alternative arrangements may operatively attach the inner disc hub 46 to the prop shaft 36 rather than the pinion shaft 34. As yet a further option, the pinion and prop shafts 34, 36 may be drivingly connected to the disconnect clutch assembly 26 through any suitable mechanical engagement.

Also packaged inside the outer clutch housing 50 is a dynamic disc carrier 48 onto which are mounted segments of all three interoperable torque-carrying subsystems. The dynamic disc carrier 48 is a hollow right-circular cylinder with reduced-diameter fore and aft ends. A needle bearing 66 rotatably and slidably mounts the dynamic disc carrier 48 onto the cylindrical hub 60 such that the disc carrier 48 is coaxial with the inner disc hub 46 and a ball ramp actuator 68. First and second axially compressible wave springs 70 and 72, respectively, are disposed at fore and aft ends of the dynamic disc carrier 48 to maintain axial alignment of the disc carrier 48 during sliding engagement and disengagement of the dog clutch 42 and cone clutch 44.

Wet-type friction disc clutch 40 of FIGS. 2 and 3 includes a multi-disc clutch pack that is packaged inside the clutch housing 50, inserted radially between the dynamic disc carrier 48 and clutch housing 50, and sandwiched in a fore-aft direction between the dog clutch 42 and ball ramp actuator 68. The clutch pack generally consists of a stack of reaction plates 41 interleaved with a stack of friction plates 43. As shown, the reaction plates 41 are splined and locked to the clutch housing 50 for common rotation therewith, whereas the friction plates 43 are splined and locked to the dynamic disc carrier 48 for common rotation therewith. It is envisioned that this splined arrangement may be switched such that the reaction plates 41 are secured to the disc carrier 48 and the friction plates 43 are secured to the clutch housing 50. When the clutch pack is compressed, the friction plates 43 frictionally lock to the reaction plates 41 such that the friction disc clutch 40 carries torque across the dynamic disc carrier 48 and clutch housing 50.

To synchronize rotation of the inner disc hub 46 with the dynamic disc carrier 48 during engagement of the dog clutch 42, a cone clutch 44 is interposed between the clutch pack plates 41, 43 and the disc hub's toroidal flange 58 such that axial compression of the clutch pack causes frictional engagement of the cone clutch 44 with the inner disc hub 46. The cone clutch 44 includes a first cone clutch ring 76 that is rigidly attached to the dynamic disc carrier 48 to slide and rotate in unison therewith. Additionally, a second cone clutch ring 78 is rigidly attached to the inner disc hub 46 to rotate in unison therewith. In accord with the illustrated example, the first cone clutch ring 76 is keyed and locked onto the outer-diameter (OD) surface of the disc carrier 48, and the second cone clutch ring 78 is integrally formed as a single-piece, unitary structure with the radially projecting toroidal flange 58 of the disc hub 46. During engagement of the cone clutch 44, the first cone clutch ring 76 translates axially (right-to-left in FIG. 2) to thereby slidably engage and compress a first axially projecting friction surface 73 against a second axially projecting friction surface 75 of the second cone clutch ring 78. In so doing, the cone clutch 44 frictionally connects the inner disc hub 46 to the dynamic disc carrier 48. The first cone clutch ring 76 may be fabricated with a frustoconical rim 77 that projects axially therefrom in a rearward direction; the first friction surface 73 is located on a radially outermost face of the frustoconical rim 77. Both friction surfaces 73, 75 may be obliquely angled with respect to the center axis of rotation A-A of the clutch assembly 26.

To eliminate slippage between the inner disc hub 46 and dynamic disc carrier 48 during engagement of the friction disc clutch 40, the dog clutch 42 provides an engineering (clearance, transition, or interference) fit that mechanically rotationally locks the toroidal flange 58 to the disc carrier 48. The dog clutch 42 includes a pair of axially spaced, facially opposing discs, namely first and second dog clutch discs 80 and 82, respectively, for carrying torque across the disc hub 46 and disc carrier 48. With this arrangement, the cone clutch ring 76 is sandwiched between the two dog clutch discs 80, 82. The first dog clutch disc 80 is rigidly attached to the dynamic disc carrier 48 to slide and rotate in unison therewith. First dog clutch disc 80 is keyed and locked onto the outer-diameter (OD) surface of the disc carrier 48, interposed between the clutch pack plates 41, 43 and the first cone clutch ring 76 with the first wave spring 70 biasing the dog clutch disc 80 away from the cone clutch ring 76. Likewise, the second dog clutch disc 82 is rigidly attached to the inner disc hub 46 to rotate in unison therewith. As shown, the second dog clutch disc 82 is integrally formed as a single-piece, unitary structure with the disc hub's toroidal flange 58. Each dog clutch disc 80, 82 is fabricated with a respective set of circumferentially spaced, axially projecting teeth 81 and 83, respectively. When the dynamic disc carrier 48 translates axially in a rearward direction (right-to-left in FIG. 2), the first set of dog clutch teeth 81 meshingly engage the second set of dog clutch teeth 83 to thereby rotatably lock the disc hub 46 to the disc carrier 48.

Engagement and disengagement of the friction disc clutch 40, dog clutch 42, and cone clutch 44 is effectuated via a ball ramp actuator 68 mounted at a proximal end of the clutch housing 50, opposite that of the stub shaft 54. A thrust bearing 84 mounted inside the clutch housing 50 permits rotation of the ball ramp actuator 68 against a piston ring 86 while supporting axial loads during activation of the disconnect clutch assembly 26. Interposed between the clutch housing 50 and piston ring 86 is a third wave spring 74 that biases the ball ramp actuator 68 to a disengaged position. The ball ramp actuator 68 includes axially spaced first and second races 88 and 90, respectively, with a series of actuator balls 92 sandwiched between and circumferentially spaced about the two actuator races 88, 90. A rearward-facing axial face of the second race 90 is fabricated with a series of circumferentially spaced, recessed ball pockets 91, each of which seats therein a respective one of the actuator balls 92. Conversely, an engine-facing axial face of the first race 88 includes a series of circumferentially spaced ball ramps 93, each of which is aligned with a respective one of the ball pockets 91. Rotation of the first race 88 causes the balls 92 to transition up the ball ramps 93 and thereby axially slide the first race 88 away from the second race 90. To engage the ball ramp actuator 68, the first race 88 is selectively rotated with respect to the second race 90, e.g., via a controller-automated stepper motor (not shown). By this means, the actuator balls 92 are moved from disengaged to engaged positions such that the balls 92 push the first race 88 away (to the left in FIG. 2) from the second race 90. This causes the piston ring 86 to press against and compress the clutch pack plates 41, 43.

To transition the vehicle powertrain system into a two-wheel drive FWD mode, the disconnect clutch assembly 26 drivingly disconnects the PTU assembly 18 from the RDM 32. To do so, the inner disc hub 46 is drivingly disconnected from the dynamic disc carrier 48 by unloading the clutch pack 41, 43, dog clutch 42, and cone clutch 44 via disengagement of the ball ramp actuator 68. When disconnected, the inner disc hub 46 remains connected to the pinion shaft 34, and the stub shaft 54 remains connected to prop shaft 36. The dynamic disc carrier 48 is concomitantly slid away from inner disc hub flange 58 and allowed to freewheel on the cylindrical hub 60. To transition the vehicle powertrain system into a four-wheel drive AWD mode, the disconnect clutch assembly 26 drivingly connects the PTU assembly 18 to the RDM 32. To do so, the inner disc hub 46 is drivingly connected to the dynamic disc carrier 48 by loading the clutch pack 41, 43, dog clutch 42, and cone clutch 44 via controlled engagement of the ball ramp actuator 68, e.g., via ECU 24.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A friction clutch assembly for transferring torque from a rotating input member to a rotatable output member, the friction clutch assembly comprising:
    a clutch housing configured to attach to one of the input member or the output member;
    an inner disc hub rotatably mounted at least partially inside the clutch housing and configured to attach to the other of the input member or the output member;
    a dynamic disc carrier axially moveable on the inner disc hub and rotatably mounted at least partially inside the clutch housing coaxial with the inner disc hub;
    a clutch pack disposed within the clutch housing and including a stack of reaction plates interleaved with friction plates, the reaction plates secured to one of the clutch housing or the dynamic disc carrier for common rotation therewith, and the friction plates secured to the other of the clutch housing or the dynamic disc carrier for common rotation therewith; and
    a cone clutch mounted on the dynamic disc carrier and interposed between the clutch pack and the inner disc hub, wherein axial movement of the dynamic disc carrier causes the cone clutch to frictionally engage the inner disc hub such that the clutch pack compresses to thereby carry torque from the input member, through the clutch housing and inner disc hub, and out to the output member.

2. The friction clutch assembly of claim 1, further comprising a dog clutch with a first dog clutch disc rigidly attached to the dynamic disc carrier for common rotation therewith, and a second dog clutch disc rigidly attached to the inner disc hub for common rotation therewith, the first and second dog clutch discs having first and second sets of axially projecting teeth, respectively, that meshingly engage with each other to thereby mechanically rotatably lock the inner disc hub to the dynamic disc carrier.

3. The friction clutch assembly of claim 2, wherein the first dog clutch disc is rigidly mounted onto the dynamic disc carrier, and the second dog clutch disc is integrally formed as a single-piece structure with the inner disc hub.

4. The friction clutch assembly of claim 3, wherein the cone clutch is sandwiched between the first and second dog clutch discs.

5. The friction clutch assembly of claim 1, wherein the cone clutch includes a first cone clutch ring rigidly attached to the dynamic disc carrier for common rotation therewith, and a second cone clutch ring rigidly attached to the inner disc hub for common rotation therewith, the first and second cone clutch rings having first and second axially projecting friction surfaces, respectively, that slidably engage with each other to thereby frictionally connect the inner disc hub to the dynamic disc carrier.

6. The friction clutch assembly of claim 5, wherein the first cone clutch ring is rigidly mounted onto the dynamic disc carrier, and the second cone clutch ring is integrally formed as a single-piece structure with the inner disc hub.

7. The friction clutch assembly of claim 6, wherein the first cone clutch ring includes a frustoconical rim projecting axially therefrom, the first friction surface of the first cone clutch ring being located on a radially outermost face of the frustoconical rim.

8. The friction clutch assembly of claim 1, further comprising a ball ramp actuator attached to the clutch housing adjacent the clutch pack, the ball ramp actuator including axially spaced first and second races with a series of balls sandwiched between and circumferentially spaced about the first and second races, wherein the first race is configured to selectively rotate with respect to the second race to thereby shift the balls from a disengaged position to an engaged position such that the balls press the first race against and push the dynamic disc carrier.

9. The friction clutch assembly of claim 8, wherein the second race includes a second axial face with circumferentially spaced ball pockets each seating therein a respective one of the balls, and the first race includes a first axial face with circumferentially spaced ball ramps each aligned with a respective one of the ball pockets such that rotation of the first race causes the balls to transition up the ball ramps and thereby axially slide the first race away from the second race.

10. The friction clutch assembly of claim 1, wherein the inner disc hub includes a toroidal flange projecting radially outward from a cylindrical hub, the cylindrical hub being coaxial with and projecting axially from one end of the clutch housing.

11. The friction clutch assembly of claim 10, wherein the output member includes a pinion shaft, and wherein the cylindrical hub includes spline teeth configured to spline to the pinion shaft.

12. The friction clutch assembly of claim 1, wherein the clutch housing includes a cylindrical shell, the friction clutch assembly further comprising a stub shaft rigidly attached to and closing off an open end of the cylindrical shell for common rotation with the clutch housing.

13. The friction clutch assembly of claim 12, wherein the input member includes a propeller (prop) shaft, and wherein the stub shaft includes spline teeth configured to spline to the prop shaft.

14. A method of assembling a friction clutch assembly for transferring torque from a rotating input member to a rotatable output member, the method comprising:
    receiving a clutch housing configured to attach to one of the input member or the output member;
    rotatably mounting an inner disc hub at least partially inside the clutch housing, the inner disc hub being configured to attach to the other of the input member or the output member;
    rotatably mounting a dynamic disc carrier at least partially inside the clutch housing coaxial with the inner disc hub such that the dynamic disc carrier is axially movable on the inner disc hub;
    positioning a clutch pack within the clutch housing, the clutch pack including a plurality of reaction plates interleaved with a plurality of friction plates, the reaction plates being secured to one of the clutch housing or the dynamic disc carrier for common rotation therewith, and the friction plates being secured to the other of the clutch housing or the dynamic disc carrier for common rotation therewith; and
    mounting a cone clutch on the dynamic disc carrier and interposed between the clutch pack and the inner disc hub, wherein axial movement of the dynamic disc carrier causes the cone clutch to frictionally engage the inner disc hub such that the clutch pack compresses to thereby carry torque from the input member, through the clutch housing and inner disc hub, and out to the output member.

15. A motor vehicle comprising:
a vehicle body with front and rear axles each rotatably mounting thereon a plurality of road wheels;
a rear-drive module drivingly connected to the rear axle;
a prop shaft selectively connectable to the rear-drive module;
a prime mover attached to the vehicle body and configured to generate torque;
a multi-speed transmission drivingly connected to the prime mover and configured to receive, modify, and output the torque generated by the prime mover; and
a friction clutch assembly interposed between the transmission and the rear axle, the friction clutch assembly being configured to selectively disconnect the prop shaft from the rear drive module, the friction clutch assembly including:
  a clutch housing with a cylindrical shell and a stub shaft closing off an open end of the cylindrical shell, wherein the stub shaft is splined to the prop shaft;
  an inner disc hub rotatably mounted at least partially inside the cylindrical shell of the clutch housing, wherein the inner disc hub is splined to a pinion shaft of the rear-drive module;
  a dynamic disc carrier rotatably mounted inside the cylindrical shell of the clutch housing concentric with the inner disc hub, wherein the dynamic disc carrier is axially slidable on the inner disc hub;
  a clutch pack disposed within the clutch housing and including a stack of reaction plates interleaved with friction plates, wherein the reaction plates are secured to the cylindrical shell for common rotation therewith, and the friction plates are secured to the dynamic disc carrier for common rotation therewith; and
  a cone clutch mounted on the dynamic disc carrier and interposed between the clutch pack and the inner disc hub,
wherein axial translation of the dynamic disc carrier on the inner disc hub causes the cone clutch to frictionally engage the inner disc hub such that the clutch pack compresses to thereby carry torque from the prop shaft, through the clutch housing and inner disc hub, and out to the rear-drive module.

16. The motor vehicle of claim 15, wherein the friction clutch assembly further comprises a dog clutch with a first dog clutch disc rigidly attached to the dynamic disc carrier for common rotation therewith, and a second dog clutch disc rigidly attached to the inner disc hub for common rotation therewith, the first and second dog clutch discs having first and second sets of axially projecting teeth, respectively, that meshingly engage with each other to thereby mechanically rotatably lock the inner disc hub to the dynamic disc carrier.

17. The motor vehicle of claim 16, wherein the cone clutch includes a first cone clutch ring rigidly attached to the dynamic disc carrier for common rotation therewith, and a second cone clutch ring rigidly attached to the inner disc hub for common rotation therewith, the first and second cone clutch rings having first and second axially projecting friction surfaces, respectively, that slidably engage with each other to thereby frictionally connect the inner disc hub to the dynamic disc carrier.

18. The motor vehicle of claim 16, wherein the friction clutch assembly further comprises a ball ramp actuator attached to the clutch housing adjacent the clutch pack, the ball ramp actuator including axially spaced first and second races with a series of balls sandwiched between and circumferentially spaced about the first and second races, wherein the first race is configured to selectively rotate with respect to the second race to thereby shift the balls from a disengaged position to an engaged position such that the balls press the first race against and compress the clutch pack.

19. The motor vehicle of claim 16, wherein the inner disc hub includes a toroidal flange projecting radially outward from a cylindrical hub, the cylindrical hub being coaxial with and projecting axially from one end of the clutch housing.

20. The motor vehicle of claim 19, wherein the cylindrical hub includes internal spline teeth configured to spline to external spline teeth of the pinion shaft.

* * * * *